United States Patent [19]
Takao et al.

[11] Patent Number: 5,330,803
[45] Date of Patent: Jul. 19, 1994

[54] LIQUID CRYSTAL DEVICE
[75] Inventors: Hideaki Takao, Sagamihara; Masanobu Asaoka, Yokohama; Makoto Kojima, Hino, all of Japan
[73] Assignee: Canon Kabushiki Kaisha, Tokyo, Japan
[21] Appl. No.: 925,209
[22] Filed: Aug. 6, 1992
[30] Foreign Application Priority Data
  Aug. 6, 1991 [JP] Japan .................. 3-219384
[51] Int. Cl.⁵ .......................................... G02F 1/1337
[52] U.S. Cl. .......................................... 428/1; 359/75; 359/78
[58] Field of Search ................ 428/1, 474.4, 474.7; 359/75, 77, 78
[56] References Cited
U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,655,561 | 4/1987 | Kanbe et al. | 350/350 S |
| 5,129,727 | 7/1992 | Hanyu et al. | 359/75 |

Primary Examiner—Alexander S. Thomas
Attorney, Agent, or Firm—Fitzpatrick, Cella, Harper & Scinto

[57] ABSTRACT

A liquid crystal device is constituted by a pair of substrates, at least one of which has an alignment film thereon, and a liquid crystal disposed between the substrates, The alignment film is formed of a resin including a first polyamide represented by formula (I) below and a second polyamide represented by formula (II) below:

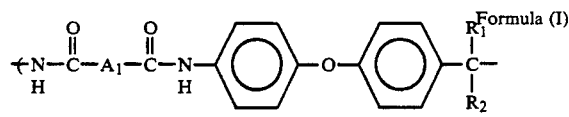
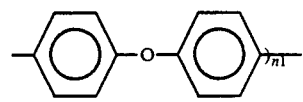
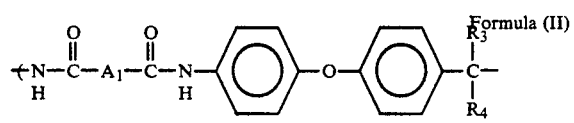
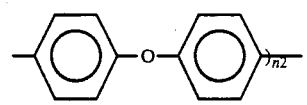

wherein $R_1$–$R_4$ independently denote a group of $CF_3(CF_2)_l(CH_2)_m$ wherein l and m are integers satisfying $l \geqq 0$ and $m \geqq 0$; $A_1$ and $A_2$ are mutually different divalent organic residues; and n1 and n2 are integers satisfying $n1 \geqq 2$ and $n2 \geqq 2$.

39 Claims, 6 Drawing Sheets

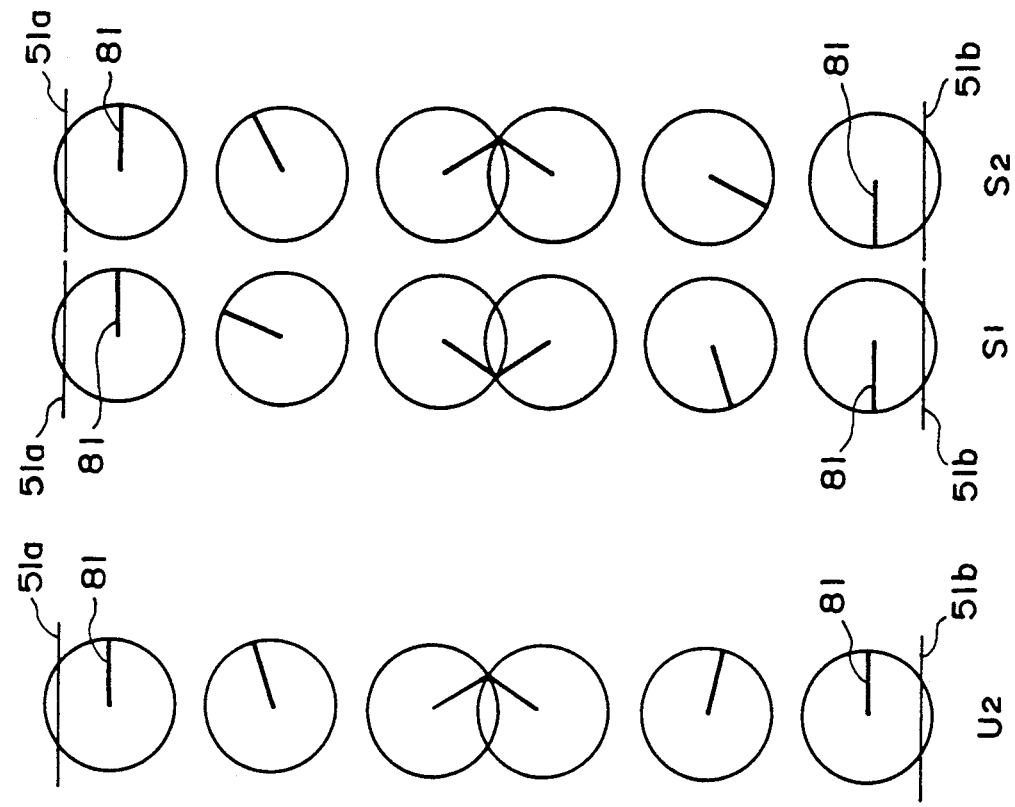
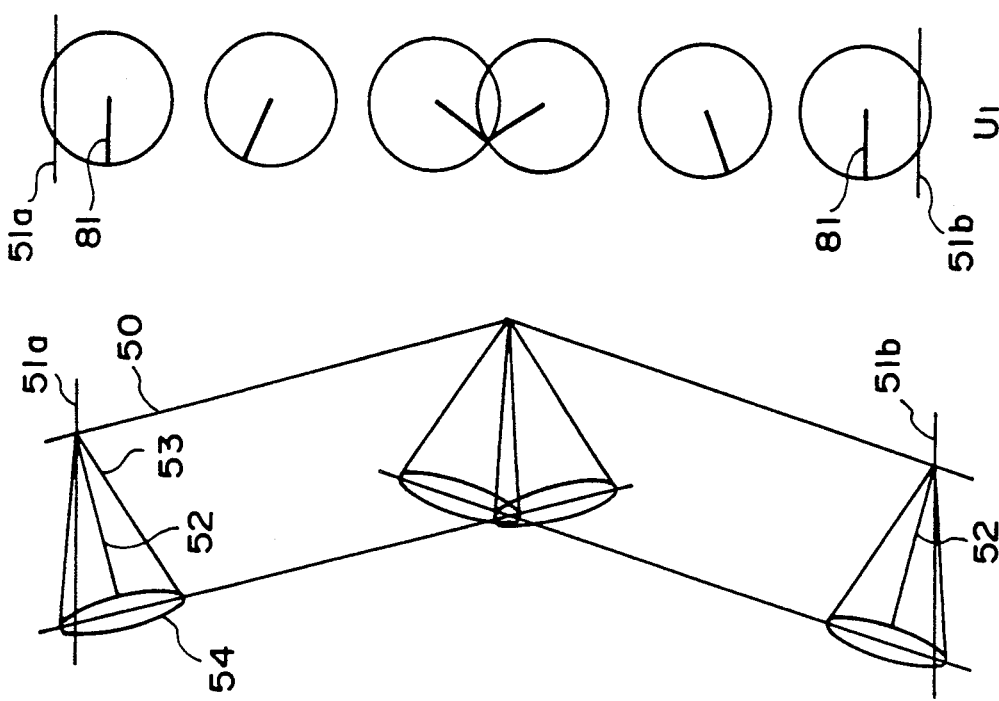
FIG. 6
FIG. 5
FIG. 4

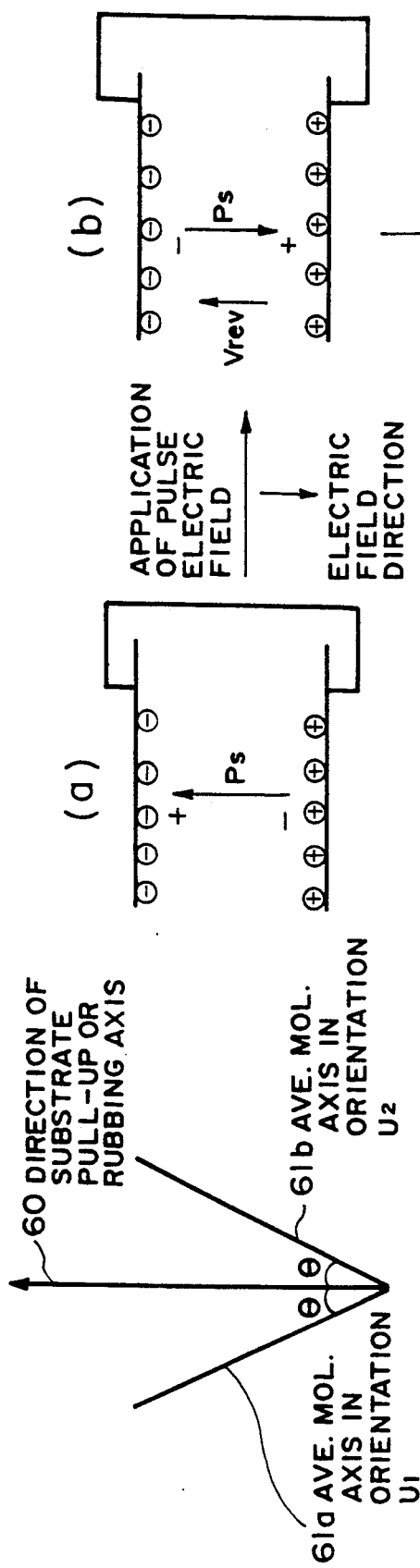
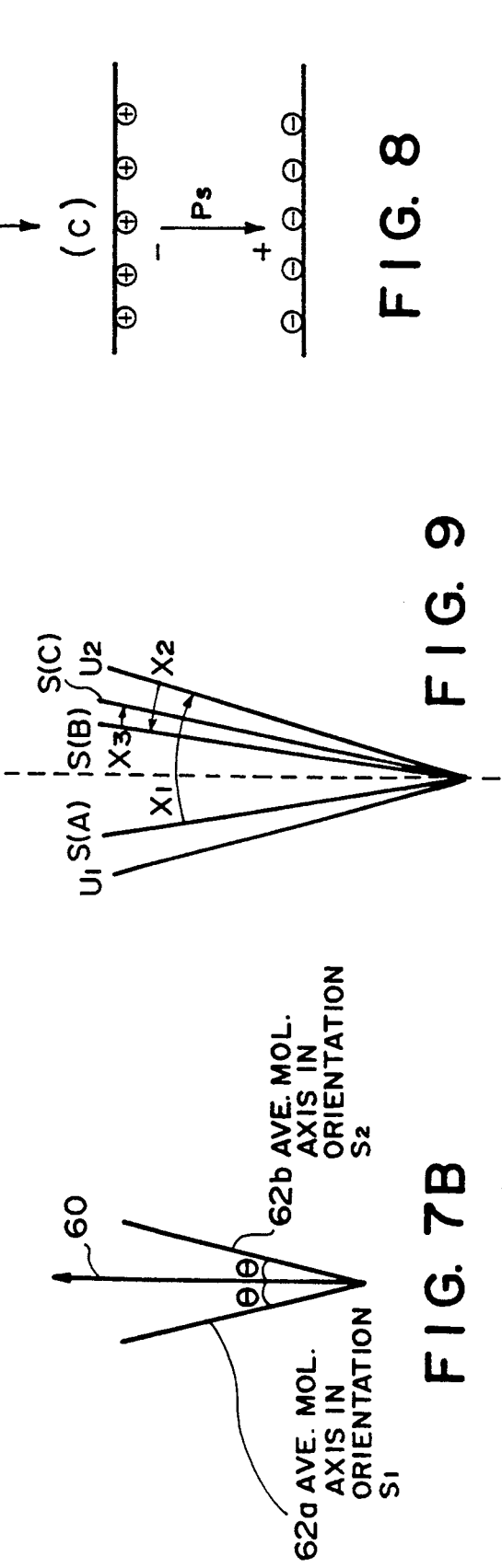
FIG. 7A
FIG. 7B
FIG. 8
FIG. 9

LIQUID CRYSTAL DEVICE

FIELD OF THE INVENTION AND RELATED ART

This invention relates to a liquid crystal device to be used in a liquid crystal display device or a liquid crystal-optical shutter, etc., particularly a liquid crystal device by use of a ferroelectric liquid crystal, more particularly to a liquid crystal device which is advantageous in view of the production process and is improved in display characteristics through improvement in initial alignment of the liquid crystal molecules.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) of H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

For an optical modulating device by use of a liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \sin^2(\Delta nd/\lambda)\pi,$$

wherein $I_0$: incident light intensity,
I: transmitted light intensity,
$\theta$: tilt angle,
$\Delta n$: refractive index anisotropy,
d: thickness of the liquid crystal layer,
$\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 3 as described below) in a ferroelectric liquid crystal with a non-helical structure obtained by alignment with an alignment control film of the prior art has become smaller as compared with a tilt angle Ⓗ (an angle shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3–8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle Ⓗ in a helical structure. More specifically, it has been found that the tilt angle $\theta$ in a non-helical structure becomes smaller than the tilt angle Ⓗ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle Ⓗ in the helical structure.

Further, in an alignment state of a chiral smectic liquid crystal attained by a conventional polyimide alignment film subjected to-a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142–143.

Further, a polyimide alignment film conventionally used heretofore has been formed by applying a solution of a polyamic acid as a precursor to form a film and curing the film at a high temperature of at least 250° C. to form a polyimide. Thus, the production process has required a large amount of energy.

Accordingly, materials for various layers formed between the substrate and the alignment film are restricted to those having a sufficient heat resistance. Particularly, regarding organic materials for color filters essential in constituting color liquid crystal devices, only heat-resistant ones can be used and the latitude of selection has been severely restricted.

On the other hand, polyamide alignment films have also been known, but no one has been known as satisfying the above-mentioned characteristics in combination.

SUMMARY OF THE INVENTION

Accordingly, an object of the present invention is to provide a ferroelectric liquid crystal device having solved the above-mentioned problems, particularly a ferroelectric liquid crystal device which provides a large tilt angle $\theta$ of a chiral smectic liquid crystal in a non-helical structure and provides a display capable of displaying a high-contrast image and yet free from after-image.

Another object of the present invention is to provide a ferroelectric liquid crystal device having an alignment film which can be formed at a low temperature through a simple process and is thus not only excellent in productivity thereof but also capable of allowing selection from a broader scope of materials for the other members.

According to the present invention, there is provided a liquid crystal device, comprising: a pair of substrates, at least one of which has an alignment film thereon, and a liquid crystal disposed between the substrates; wherein said alignment film comprises a resin including a first polyamide represented by formula (I) below and a second polyamide represented by formula (II) below:

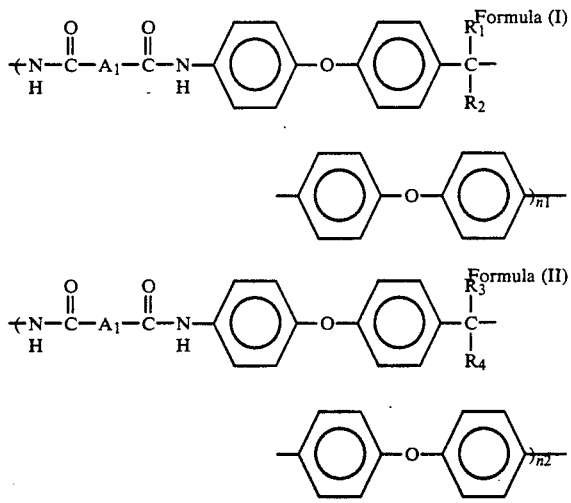

wherein $R_1$ -$R_4$ independently denote a group of $CF_3(CF_2)_l(CH_2)_m$ wherein l and m are integers satisfying $l \geq 0$ and $m \geq 0$; $A_1$ and $A_2$ are mutually different divalent organic residues; and n1 and n2 are integers satisfying $n1 \geq 2$ and $n2 \geq 2$.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 is a schematic sectional view showing an alignment state of a chiral smectic liquid crystal aligned according to the present invention. FIG. 5 is an illustration of C-director alignments in a uniform alignment state. FIG. 6 is an illustration of C-director alignments in a splay alignment state.

FIGS. 7A and 7B are plan views illustrating tilt angles $\theta$ in a uniform alignment state and a splay alignment state, respectively.

FIG. 8 is a sectional view showing a charge distribution, a direction of a spontaneous polarization $P_S$ and a direction of a reverse electric field $V_{rev}$.

FIG. 9 is a schematic plan view illustrating changes in tilt angle $\theta$ during and after application of an electric field.

DETAILED DESCRIPTION OF THE INVENTION

Figure 1:
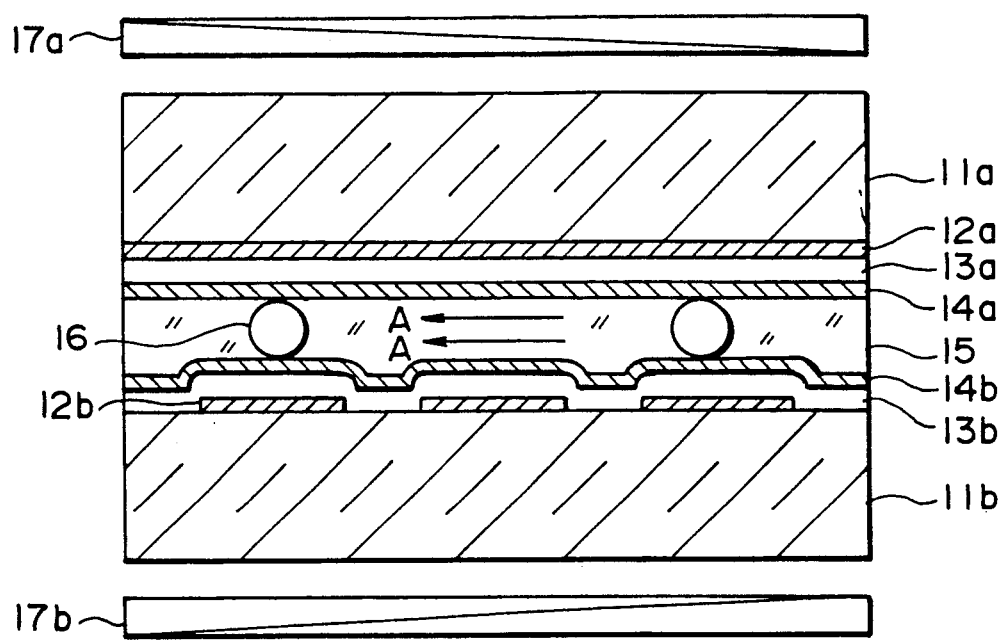
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200–1500 Å-thick insulating films 13a of $SiO_2$, $TiO_2$, $Ta_2O_5$, etc., and 50–1000 Å-thick alignment control films 14a and 14b of the above-mentioned polyamide.

In this instance, the alignment control films 14a and 14b have been treated by rubbing in directions which are parallel to each other and in the same direction (indicated by arrows A in FIG. 1). A chiral smectic liquid crystal 15 is disposed between the substrates 11a and 11b, and the spacing between the substrates 11a and 11b is set to provide the ferroelectric liquid crystal layer 15 with a thickness (e.g., 0.1–3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state. The cell structure thus formed is sandwiched between a pair of polarizers 17a and 17b.

In the present invention, the alignment film is formed as a composite of at least two polyamides including those represented by the above-mentioned formulae (I) and (II) wherein at least one, e.g., $A_1$, of $A_1$ and $A_2$ is selected to be a divalent organic residue having a linear molecular chain structure (in a sense of being forced to have a linear structure, i.e., substantially non-flexible chain structure, examples of which may include:

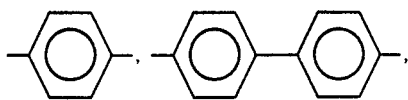

-continued

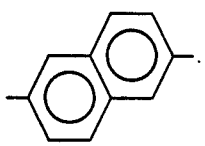

More preferably, the other, e.g., A₂, of A₁ and A₂, is selected to be a divalent organic residue having a non-linear molecular chain structure (in a sense of including a fixedly non-linear chain structure and a flexible chain structure), examples of which may include:

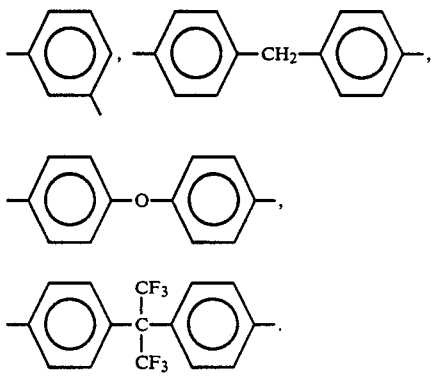

The first and second polyamides constituting the alignment film of the present invention may respectively be obtained by polymerizing a diamine and a dicarboxylic acid as described below.

Examples of dicarboxylic acids having a linear molecular structure may include: terephthalic acid, 4,4'-biphenyldicarboxylic acid, and 2,6-naphthalenedicarboxylic acid.

Examples of dicarboxylic acids having a non-linear molecular structure may include: isophthalic acid, 4,4'-dicarboxydiphenylmethane, 4,4'-dicarboxyl-diphenyl ether, and 2,2-bis(4-carboxyphenyl)-hexafluoropropane.

Suitable diamines may include 2,2-bis[4-(aminophenoxy)phenyl]fluoroalkyl compounds represented by the following formula (III-1) or (III-2):

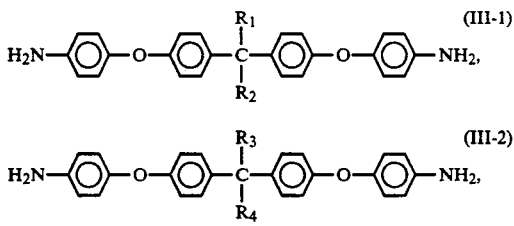

wherein $R_1$ - $R_4$ independently denote a group of $CF_3(CF_2)_l(CH_2)_m$ wherein l and m are integers satisfying $b\ 1 \geq 0$ and $m \geq 0$.

It is difficult to align liquid crystal molecules so as to provide an average molecular axis causing a tilt angle which is close to a maximum tilt angle as will be described hereinafter. Further, a composite of an ordinary combination of two polyamides frequently fails to provide desired characteristics. However, according to our study, it has been found that a large pretilt angle is provided by a specific composite, i.e., a combination of at least two types of polyamides including the first and second polyamides represented by the formulae (I) and (II), respectively, at least one of which has been obtained from a dicarboxylic acid having a linear molecular structure. The first and second polyamides may be combined in a weight ratio of 1:0.01–100.

The above-mentioned at least two polyamides including the first and second polyamides may be composited as a polymer blend, a copolymer including the units of the first and second polyamides in a molar (or weight) ratio of 1:0.01–100, or a laminate of the respective polyamide layers, to form an alignment film according to the present invention.

A polyamide film used in the present invention may be formed by dissolving a relevant polyamide (a single polyamide, a blend of at least two polyamides or a co-polyamide) in a solvent, such as dimethylformamide, dimethylacetamide, dimethylsulfoxide or N-methylpyrrolidone to form a solution at a concentration of 0.01–40 wt. %, and applying the solution onto the substrate by spinner coating, spray coating, roller coating, etc., followed by heating at 100°–250° C., preferably at 150°–220° C., for evaporation of the solvent to form the polyamide film. As described above, such polyamide films can be laminated to form an alignment film. The polyamide alignment film according to the present invention may be thus formed in a thickness of about 30 Å- about 1 μm, preferably 200 Å–2000 Å, and then subjected to rubbing with, e.g., cloth, thereafter. In this instance, it is possible to omit the insulating films 13a and/or 13b. Further, in case where the polyamide alignment film is formed on the insulating film 13a and 13b, the polyamide film may be formed in a thickness of at most 200 Å, preferably at most 100 Å.

The rubbing may be applied to both of the alignment films 14a and 14b. In this instance, the rubbing directions to the alignment films 14a and 14b may be parallel identical directions, parallel reverse directions or slightly crossing identical directions forming an intersection angle of 2–20 degrees, preferably 5–15 degrees.

The liquid crystal material used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 microns or longer in cholesteric phase (measured at a mid temperature in the cholesteric range). Preferred examples of such a liquid crystal material may include liquid crystal materials (1)–(5) below comprising the following liquid crystals "LC-1", "80B" and "80SI*" in the indicated proportions by weight.

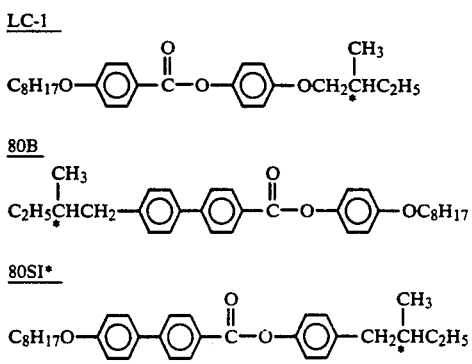

LIQUID CRYSTAL MATERIAL (1) (LC-1)$_{90}$/(80B)$_{10}$
(2) (LC-1)$_{80}$/(80B)$_{20}$
(3) (LC-1)$_{70}$(80B)$_{30}$
(4) (LC-1)$_{60}$(80B)$_{40}$
(5) (80SI*)$_{100}$

Figure 2:
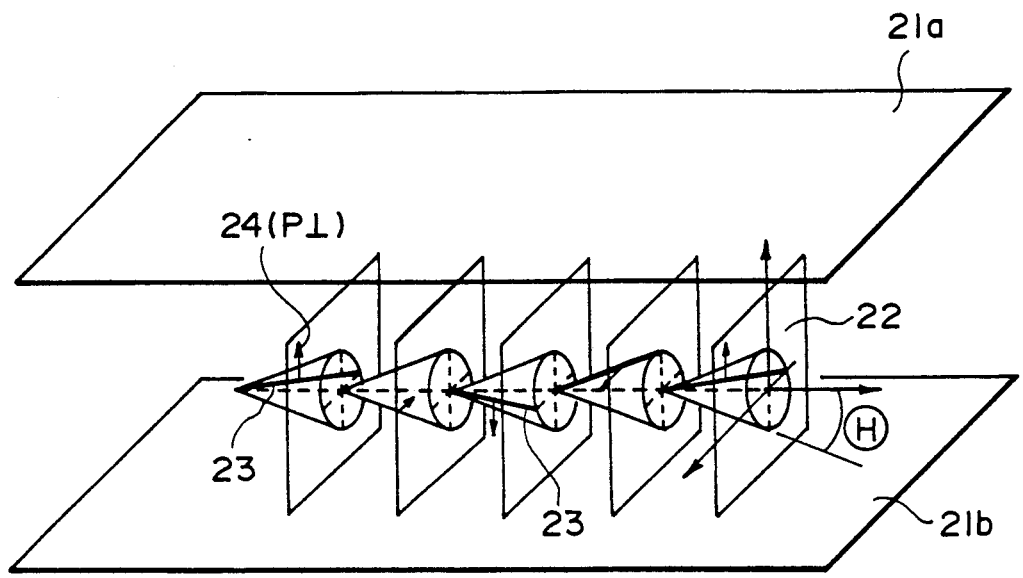
FIG. 2 is a perspective view showing schematically an alignment of a chiral smectic liquid crystal having a helical structure.

FIG. 2 is a schematic illustration of a ferroelectric liquid crystal cell (device) for explaining operation thereof. Reference numerals 21a and 21b denote substrates (glass plates) on which a transparent electrode of, e.g., In$_2$O$_3$, SnO$_2$, ITO (indium-tin-oxide), etc., is disposed, respectively. A liquid crystal of an SmC*-phase (chiral smectic C phase) or SmH,-phase (chiral smectic H phase) in which liquid crystal molecular layers 22 are aligned perpendicular to surfaces of the glass plates is hermetically disposed therebetween. Full lines 23 show liquid crystal molecules, and disposed on cones forming in succession a helical structure in the direction of extension of the substrates. A half of the apex angle of the cone provides a tilt angle (H) in the helical structure of the chiral smectic phase. Each liquid crystal molecule 23 has a dipole moment (P⊥) 24 in a direction perpendicular to the axis thereof. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show a refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
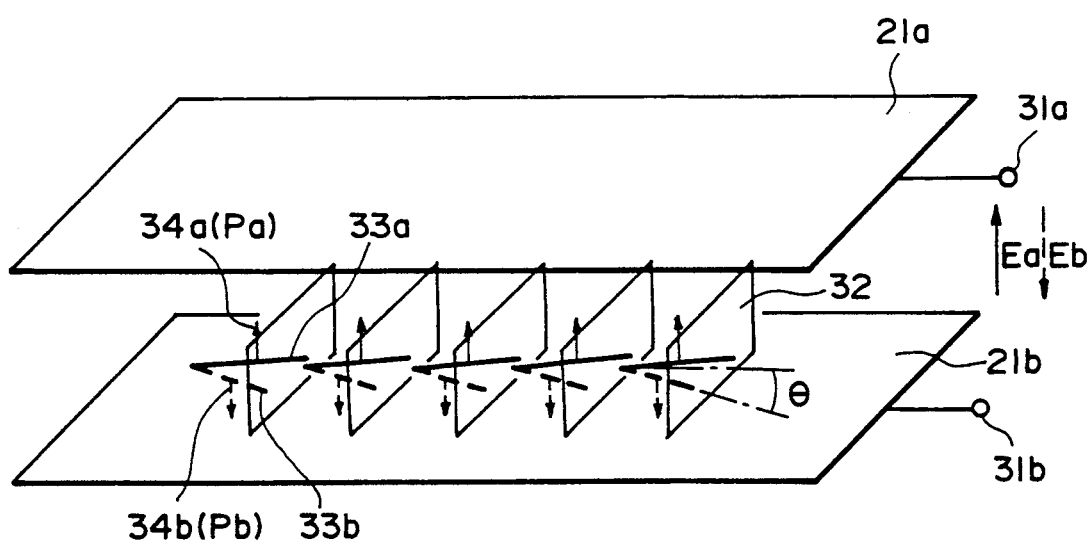
FIG. 3 is a perspective view showing schematically an alignment state of a chiral smectic liquid crystal having a non-helical structure.

Further, when the liquid crystal cell is made sufficiently thin (e.g., 0.1-3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b. A half of the angle between the first and second stable states corresponds to a tilt angle θ.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 4 is a schematic sectional view showing an alignment state of liquid crystal molecules attained by the present invention, and FIG. 5 is a view showing alignment of corresponding C-directors.

Reference numerals 51a and 51b in FIG. 4 denote upper and lower substrates, respectively. Numeral 50 denotes a molecular layer composed of liquid crystal molecules 52, and liquid crystal molecules 52 are aligned so as to change their positions along the bottom face 54 (circular) of a cone 54. FIG. 5 more specifically shows a change in C-directors. Referring to FIG. 5, at U$_1$ are shown C-directors 81 (each being a projection of a molecular long axis onto an imaginary plane perpendicular to the normal to a molecular layer 50) in one stable orientation state, and at U$_2$ are shown C-directors 81 in the other stable orientation state.

On the other hand, an alignment state attained by a conventional rubbing-treated polyimide film may be represented by a C-director diagram of FIG. 6, which shows an alignment state wherein molecular axes are twisted in a large degree from the upper substrate 51a to the lower substrate 51b to provide a smaller tilt angle θ.

FIG. 7A is a schematic plan view illustrating a tilt angle θ in an alignment state where C-directors 81 assume a state shown in FIG. 5 (referred to as "uniform alignment state"), and FIG. B is a schematic plan view illustrating a tilt angle θ in an alignment state where C-directors 81 assume a state shown in FIG. 6 (referred to as "splay alignment state"). In these figures, reference numeral 60 denotes a rubbing axis provided to the above-mentioned specific polyamide composite film, numeral 61a denotes an average molecular axis in the orientation state U$_1$, numeral 61b denotes an average molecular axis in the orientation state U$_2$, numeral 62a denotes an average molecular axis in the orientation state S$_1$, and numeral 62b denotes an average molecular axis in the orientation state S$_2$. The average molecular axes 61a and 61b can be switched to each other by applying voltages of mutually opposite polarities. Similar switching is caused between the average molecular axes 62a and 62b.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$, Vrev causing after-image is expressed by the following equation.

$$Vrev = 2P_S/(Ci + C_{LC})$$

FIG. 8 is a schematic sectional view illustrating changes in charge distribution direction of $P_S$ and direction of the reverse electric field in a liquid crystal cell. At FIG. 8(a), there is shown a distribution of ⊕ and ⊖ charges in a memory state before application of a pulse electric field, where the spontaneous polarization is directed from ⊕ charges to ⊖ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stable orientation state to the other orientation state) but the distribution of the ⊕ and ⊖ charges is similar to that shown at FIG. 8(a), so that a reverse electric field Vrev is generated as indicated by an arrow shown at FIG. 8(b). The reverse electric field Vrev disappears in a short time to provide a distribution of ⊕ and ⊖ charges as shown at FIG. 8(c).

Figure 10:
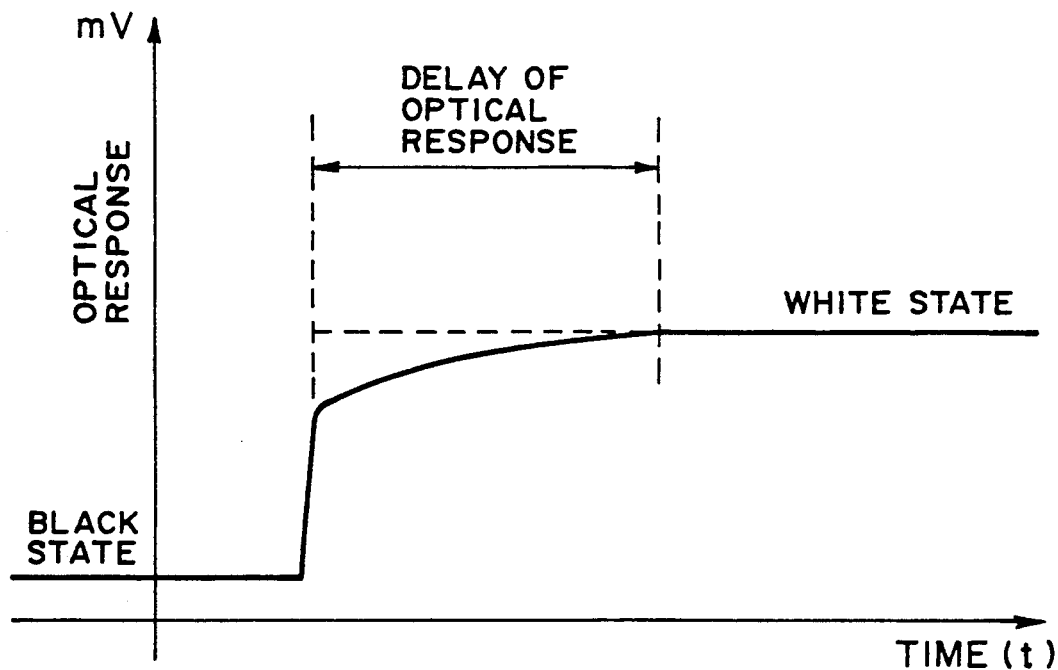
FIGS. 10 and 11 are graphs showing optical response characteristics according to a conventional device and the present invention, respectively.

FIG. 9 is a plan view showing a change in optical response in a splay alignment state given by a conventional polyimide or polyamide alignment film in terms of a change in tilt angle θ. Referring to FIG. 9, at the time of application of a pulse electric field, the orientation of liquid crystal molecules is changed from an average molecular axis S(A) in a splay alignment state to be overshot to an average molecular axis U₂ in a uniform alignment state close to that providing a maximum tilt angle Ⓗ along a path denoted by an arrow X₁, and immediately after the removal of the pulse electric field, the orientation is changed along a path denoted by an arrow X₂ to an average molecular axis S(B) in a splay alignment state providing a decreased tilt angle θ due to the action of the reverse electric field Vrev shown at FIG. 8(b). Then, as the reverse electric field Vrev attenuates as shown at FIG. 8(c), the orientation is changed along a path denoted by an arrow X₃ to an average molecular axis S(C) in a splay alignment state providing a stable orientation state having a somewhat increased tilt angle θ. FIG. 10 is a graph showing an optical response at this time.

Figure 11:
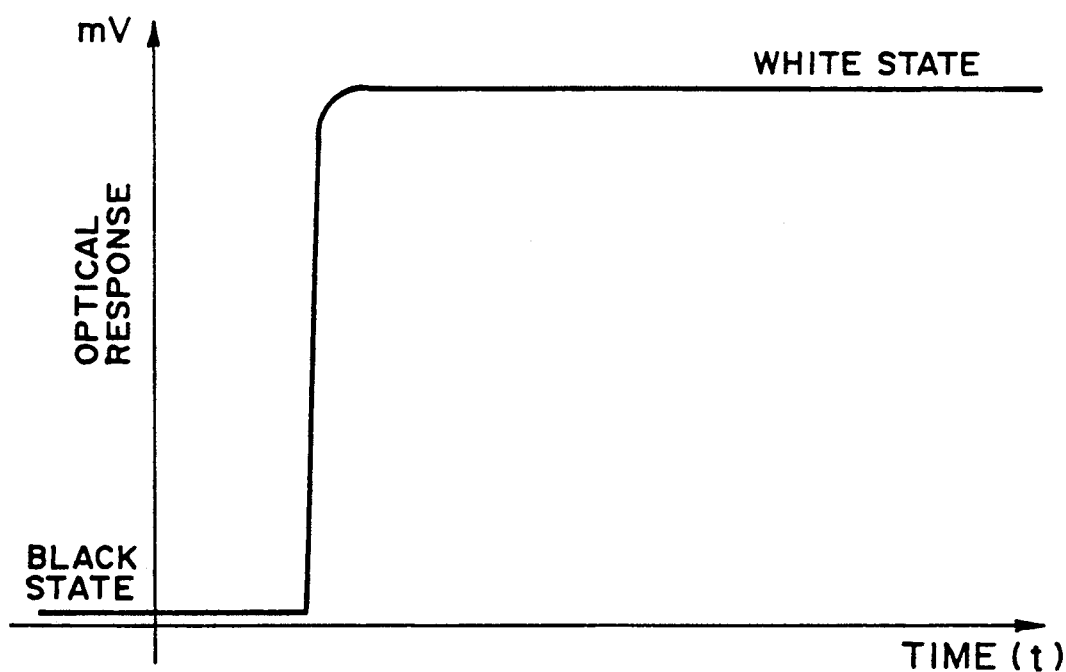

In the alignment state given by using the above-mentioned specific polyamide composite film of the present invention, the average molecular axes S(A), S(B) and S(C) in the splay alignment state shown in FIG. 9 are not caused but it is possible to form an alignment state with an average molecular axis giving a tilt angle θ which is close to a maximum tilt angle Ⓗ. An optical response at this time according to the present invention is shown in FIG. 11. FIG. 11 shows that a delay in optical response causing after-image is obviated and a high contrast in memory states is caused.

Hereinbelow, the present invention will be explained based on Examples.

EXAMPLE 1

Two 1.1 mm-thick glass plates each provided with a 1000 Å-thick ITO film were respectively coated with a 3.0 wt. % solution of a 1:1 blend of two polyamides represented by the following structural formulae (A) and (B) in a mixture solvent of N-methylpyrrolidone/n-butylcellosolve =5/1 by spin coating, followed by curing under heating at 220° C. for 1 hour to form a 300 Å-thick composite polyamide film.

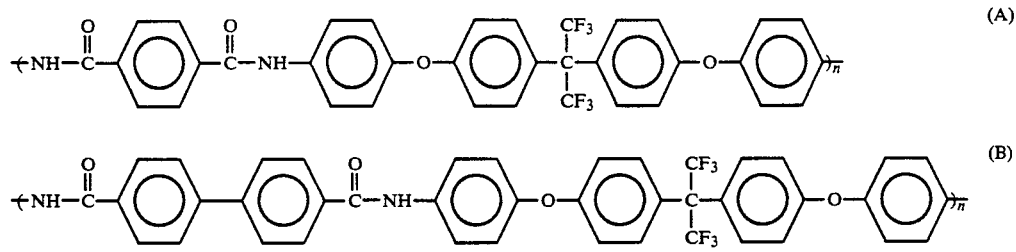

The coating film was then rubbed in one direction with a nylon-planted cloth.

On one of the two glass plates thus treated, 1.5 microns alumina beads were dispersed, and the other glass plate was superposed thereon so that their rubbing axes were parallel to each other and disposed in the same direction to form a blank cell.

The blank cell was filled with a ferroelectric smectic liquid crystal ("CS-1014" (trade name), available from Chisso K.K.) under vacuum and, after sealing, was gradually cooled from isotropic phase at a rate of 5° C./hour to 30° C., whereby an alignment was effected. The "CS-1014" liquid crystal in the cell showed the following phase transition series.

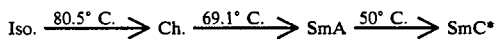

Iso.: isotropic phase,
Ch.: cholesteric phase,
SmA: smectic A phase,
SmC*: chiral smectic C phase.

The experiment thereafter was performed at 25° C.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ = 15 degrees, transmittance in the brightest state = 29%, transmittance in the darkest state = 1%, contrast ratio = 29:1.

The delay in optical response causing after-image was 0.2 sec or less.

Figure 12:
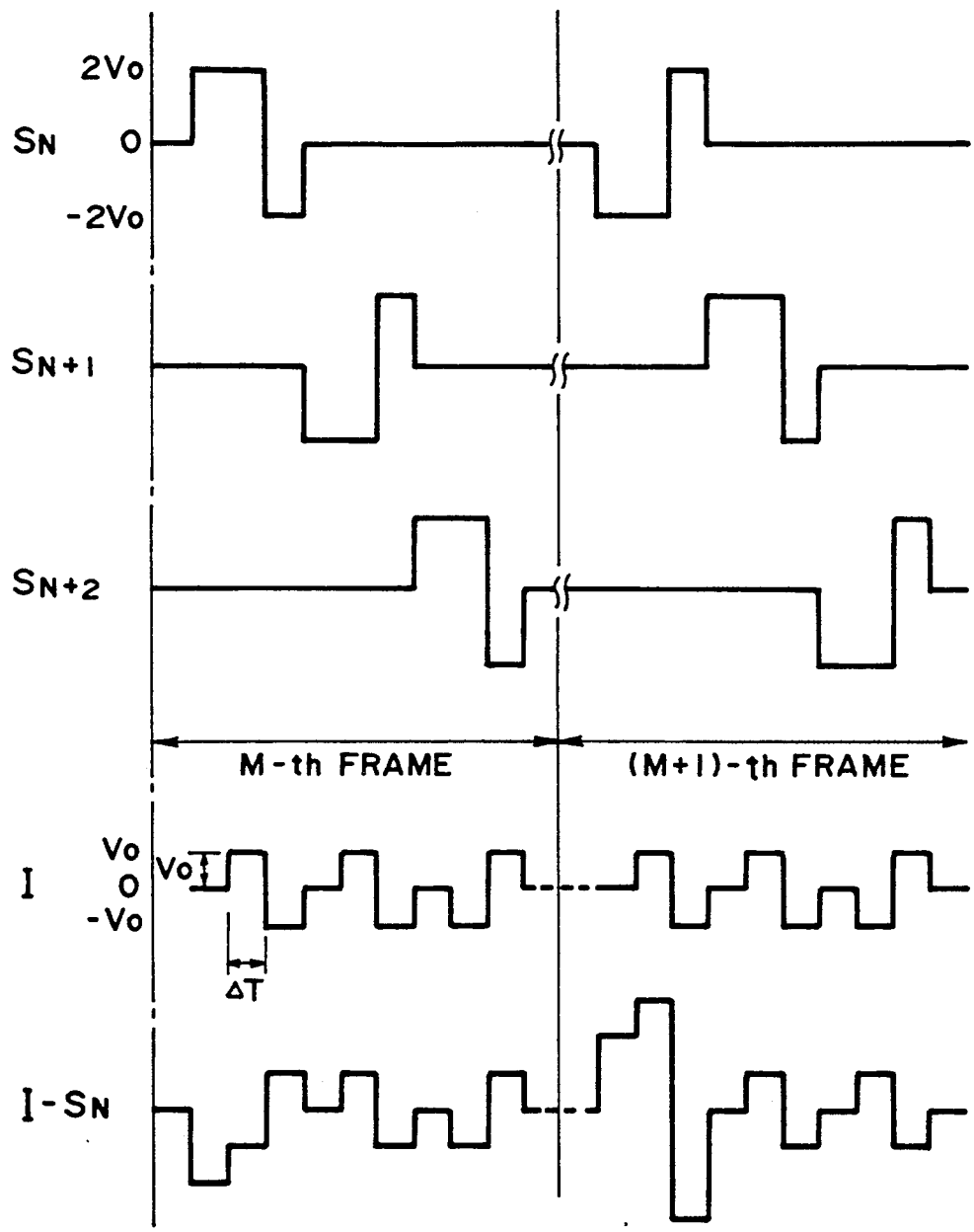
FIG. 12 is a waveform diagram illustrating driving waveforms used in an embodiment of the present invention.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$ = 5–8 volts and T = 20–70 μsec.

EXAMPLE 2

A liquid crystal cell was prepared in the same manner as in Example 1 except that a composite polyamide alignment film was formed from a 1:1 blend of two polyamides represented by the following structural formulae (C) and (D).

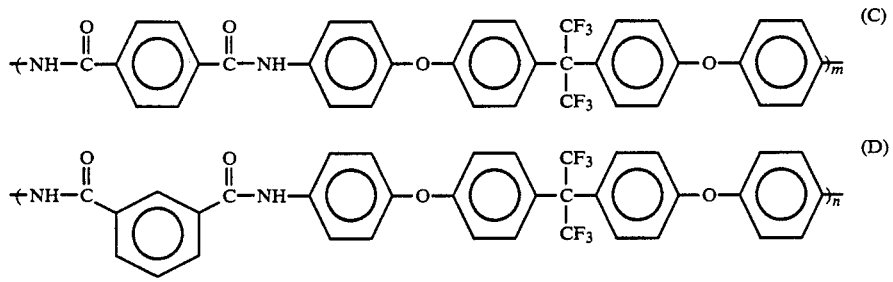

As a result of the same test, the resultant cell showed a contrast ratio of 25:1 and a delay in optical response of 0.2 sec.

As a result of the same multiplexing drive display test as in Example 1, good results were obtained with respect to contrast and after-image similarly as in Example 1.

EXAMPLE 3

A liquid crystal cell was prepared in the same manner as in Example 1 except that a composite polyamide alignment film was formed from a 1:1 blend of two polyamides represented by the following structural formulae (E) and (F).

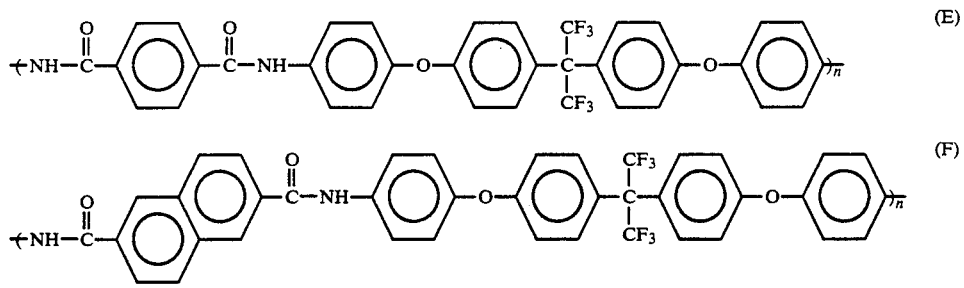

As a result of the same test, the resultant cell showed a contrast ratio of 28:1 and a delay in optical response of 0.2 sec.

As a result of the same multiplexing drive display test as in Example 1, good results were obtained with respect to contrast and after-image similarly as in Example 1.

COMPARATIVE EXAMPLE 1

A liquid crystal cell was prepared in the same manner as in Example 1 except that an alignment film was formed from a single polyamide represented by the following structural formulae (C1).

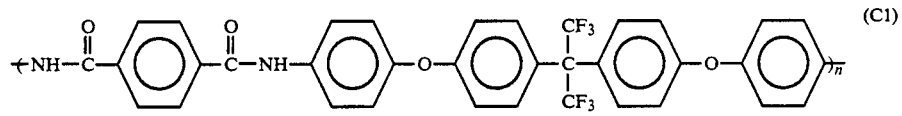

As a result of the same test, the resultant cell showed a contrast ratio of 15:1 and a delay in optical response of 1.5 sec.

As a result of the same multiplexing drive display test as in Example 1, the contrast was smaller than in Example 1, and after-image was observed.

COMPARATIVE EXAMPLE 2

A liquid crystal cell was prepared in the same manner as in Example 1 except that a composite polyamide alignment film was formed from a 1:1 blend of two polyamides represented by the following structural formulae (C2) and (C3).

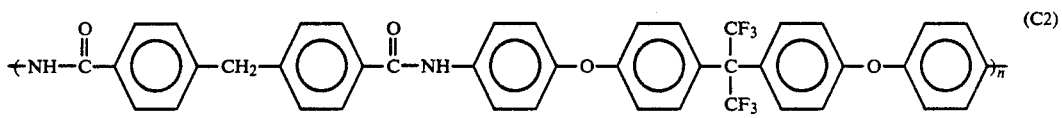
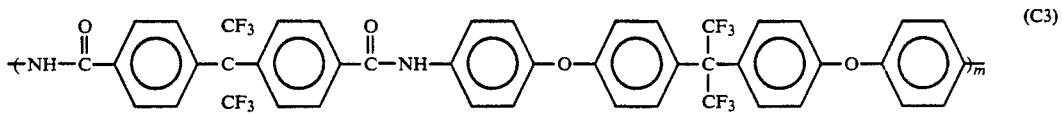

As a result of the same test, the resultant cell showed a contrast ratio of 7:1 and a delay in optical response of 1.8 sec.

As a result of the same multiplexing drive display test as in Example 1, the contrast was smaller than in Example 1 and after-image was observed.

COMPARATIVE EXAMPLE 3

A liquid crystal cell was prepared in the same manner as in Example 1 except that a composite polyimide alignment film was formed from a 1:1 blend of two polyamides acids represented by the following structural formulae (C4) and (C5), followed by curing at 270° C.

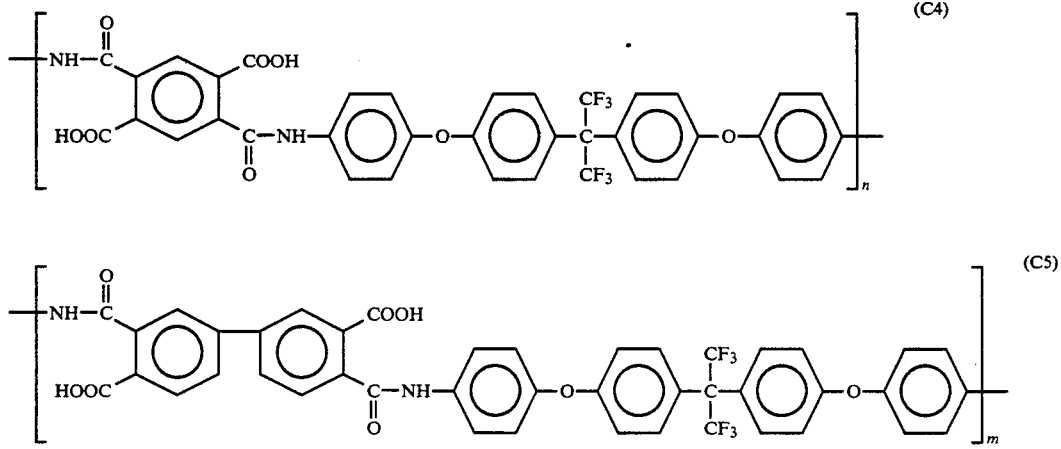

As a result of the same test, the resultant cell showed a contrast ratio of 29:1 and a delay in optical response of 0.2 sec.

As a result of the same multiplexing drive display test as in Example 1, good results were obtained with respect to contrast and after-image similarly as in Example 1. However, these good results were obtained only when the calcination was performed at a temperature of at least 250° C. for cyclization to form a polyimide structure.

COMPARATIVE EXAMPLE 4

A liquid crystal cell was prepared in the same manner as in Example 1 except that a composite polyamide alignment film was formed from a 1:1 blend of two polyamides represented by the following structural formulae (C6) and (C7).

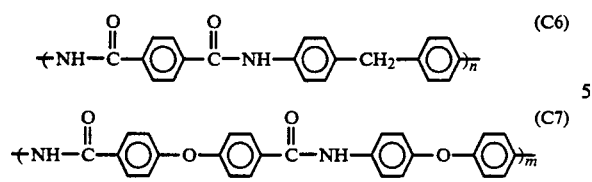

As a result of the same test, the resultant cell showed a contrast ratio of 6:1 and a delay in optical response of 2.2 sec.

As a result of the same multiplexing drive display test as in Example 1, the contrast was smaller than in Example 1 and after-image was observed.

As described above, the liquid crystal device according to the present invention is obtained without a high temperature treatment as required in formation of a conventional polyimide alignment film and thus at a high productivity. The thus obtained liquid crystal device is provided with a high contrast between the bright and dark states and particularly a high-quality display with a very high display contrast in multiplexing drive, and is also free from ugly after-image.

What is claimed is:

1. A liquid crystal device, comprising: a pair of substrates, at least one of which has an alignment film thereon, and a liquid crystal disposed between the substrates; wherein said alignment film comprises a resin including a first polyamide represented by formula (I) below and a second polyamide represented by formula (II) below:

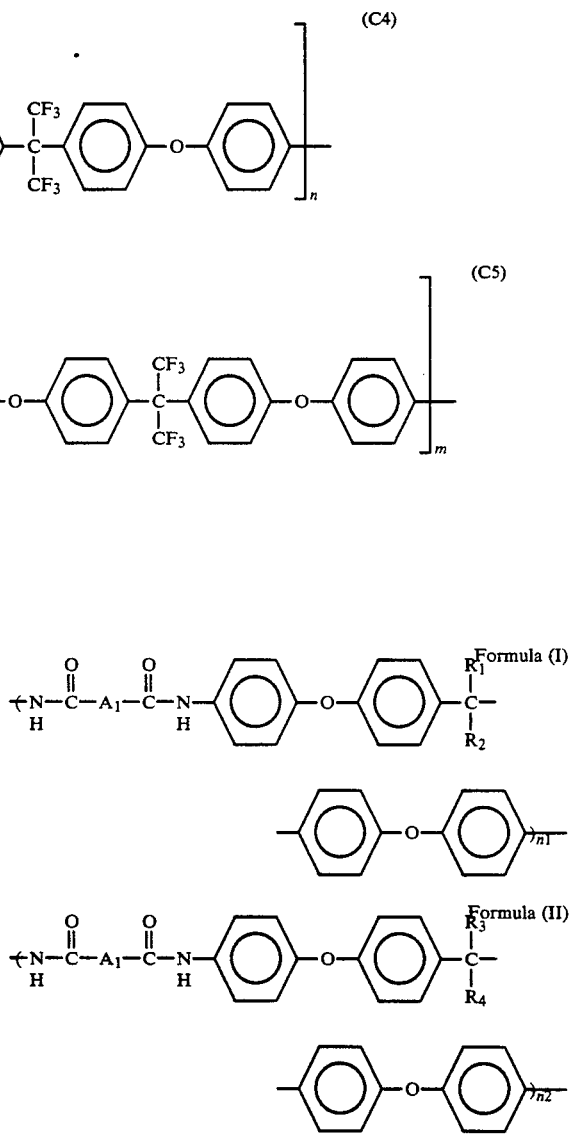

wherein $R_1$-$R_4$ independently denote a group of $CF_3(CF_2)_l(CH_2)_m$ wherein $l$ and $m$ are integers satisfying $l \geq 0$ and $m \geq 0$; and $A_1$ and $A_2$ are mutually different divalent organic residues; and $n1$ and $n2$ are integers satisfying $n1 \geq 2$ and $n2 \geq 2$.

2. A device according to claim 1, wherein at least one of $A_1$ and $A_2$ has a linear molecular chain structure.

3. A device according to claim 2, wherein said linear molecular chain structure is represented by

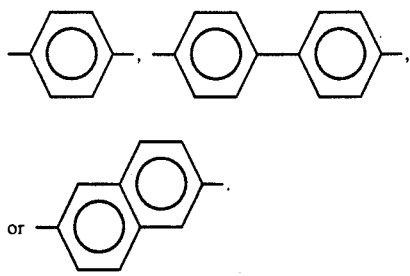

4. A device according to claim 1, wherein said liquid crystal is a chiral smectic liquid crystal.

5. A device according to claim 1, wherein $A_1$ has a linear molecular chain structure and $A_2$ has a non-linear molecular chain structure.

6. A device according to claim 5, wherein said linear molecular chain structure is represented by

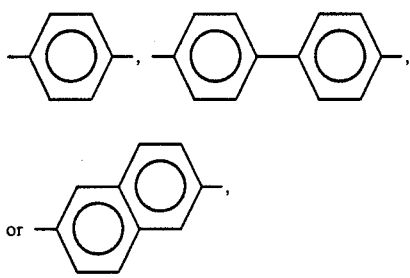

linear molecular chain structure is represented by

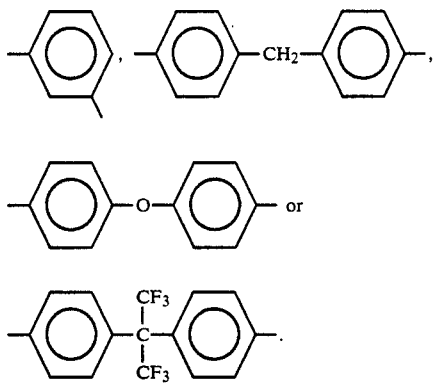

7. A device according to claim 1, wherein said alignment film comprises a blend of the first and second polyamides.

8. A device according to claim 1, wherein said alignment film comprises a copolymer of the first and second polyamides.

9. A device according to claim 1, wherein said alignment film comprises a laminate of the first and second polyamides.

10. A device according to claim 1, wherein said alignment film has a thickness of at most 200 Å.

11. A device according to claim 1, wherein said alignment film has a thickness of at most 100 Å.

12. A device according to claim 1, wherein said alignment film has been rubbed in one direction.

13. A device according to claim 1, wherein said alignment film is provided to both substrates, and the two alignment films have been rubbed in directions which are parallel and identical to each other.

14. A device according to claim 1, wherein said alignment film is provided to both substrates, and the two alignment films have been rubbed in directions which are almost identical but cross each other at an intersection angle of 2-20 degrees.

15. A device according to claim 1, wherein said alignment film is provided to both substrates, and the two alignment films have been rubbed in directions which are parallel and reverse to each other.

16. An electrode plate for a liquid crystal device, comprising: a substrate and an alignment film formed on the substrate; wherein said alignment film comprises a resin including a first polyamide represented by formula (I) below and a second polyamide represented by formula (II) below:

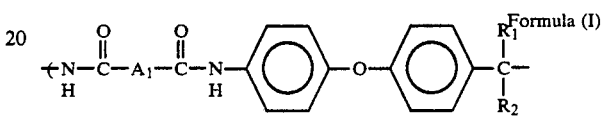

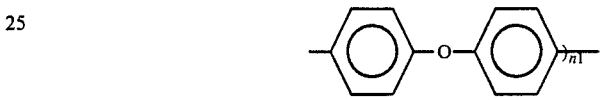

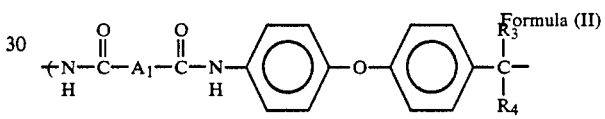

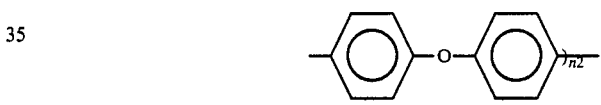

wherein $R_1$–$R_4$ independently denote a group of $CF_3(CF_2)_l(CH_2)_m$ wherein l and m are integers satisfying $l \geq 0$ and $m \geq 0$; $A_1$ and $A_2$ are mutually different divalent organic residues; and n1 and n2 are integers satisfying $n1 \geq 2$ and $n2 \geq 2$.

17. An electrode plate according to claim 16, wherein at least one of $A_1$ and $A_2$ has a linear molecular chain structure.

18. An electrode plate according to claim 17, wherein said linear molecular chain structure is represented by

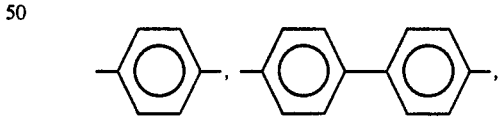

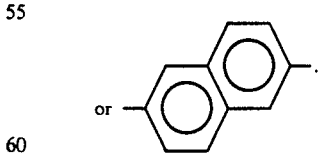

19. An electrode plate according to claim 16, wherein said liquid crystal is a chiral smectic liquid crystal.

20. An electrode plate according to claim 16, wherein $A_1$ has a linear molecular chain structure and $A_2$ has a non-linear molecular chain structure.

21. An electrode plate according to claim 20, wherein said linear molecular chain structure is represented by

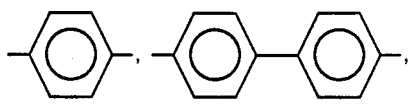

and said non-linear molecular chain structure is represented by

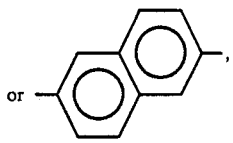

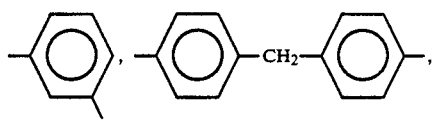

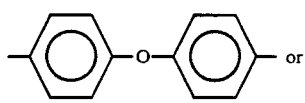

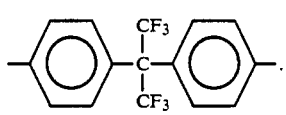

22. An electrode plate according to claim 16, wherein said alignment film comprises a blend of the first and second polyamides.

23. An electrode plate according to claim 16, wherein said alignment film comprises a copolymer of the first and second polyamides.

24. An electrode plate according to claim 16, wherein said alignment film comprises a laminate of the first and second polyamides.

25. A liquid crystal apparatus, including:
(a) a liquid crystal panel comprising a pair of substrates having thereon scanning electrodes and data electrodes, respectively, so as to form an electrode matrix, at least one of the substrates further having thereon an alignment film; and a liquid crystal disposed between the substrates;
(b) drive means for applying a scanning signal to the scanning electrodes and applying data signals to the data electrodes in synchronism with the scanning signal;
wherein said alignment film comprises a resin including a first polyamide represented by formula (I) below and a second polyamide represented by formula (II) below:

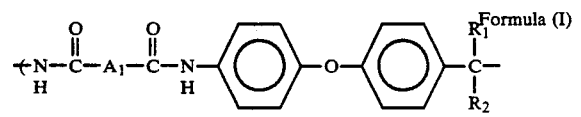

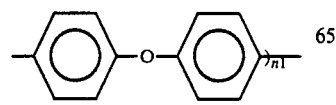

-continued

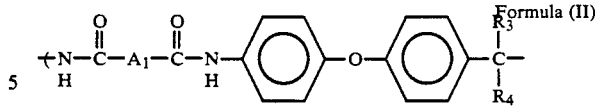

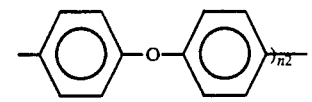

wherein $R_1$ – $R_4$ independently denote a group of $CF_3(CF_2)_l(CH_2)_m$ wherein $l$ and $m$ are integers satisfying $l \geq 0$ and $m \geq 0$; $A_1$ and $A_2$ are mutually different divalent organic residues; and $n1$ and $n2$ are integers satisfying $n1 \geq 2$ and $n2 \geq 2$.

26. An apparatus according to claim 25, wherein at least one of $A_1$ and $A_2$ has a linear molecular chain structure.

27. An apparatus according to claim 26, wherein said linear molecular chain structure is represented by

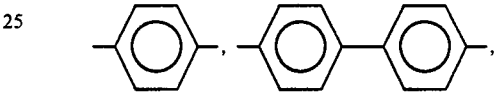

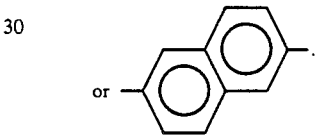

28. An apparatus according to claim 25, wherein said liquid crystal is a chiral smectic liquid crystal.

29. An apparatus according to claim 25, wherein $A_1$ has a linear molecular chain structure and $A_2$ has a non-linear molecular chain structure.

30. An apparatus according to claim 29, wherein said linear molecular chain structure is represented by

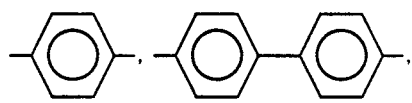

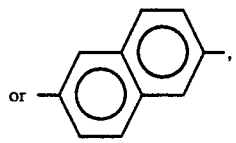

and said non-linear molecular chain structure is represented by

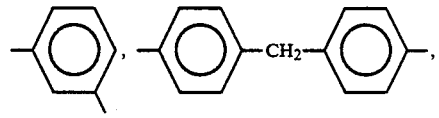

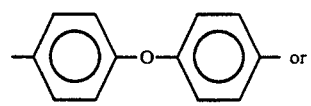

-continued

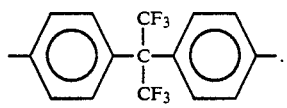

31. An apparatus according to claim 25, wherein said alignment film comprises a blend of the first and second polyamides.

32. An apparatus according to claim 25, wherein said alignment film comprises a copolymer of the first and second polyamides.

33. An apparatus according to claim 25, wherein said alignment film comprises a laminate of the first and second polyamides.

34. An apparatus according to claim 25, wherein said alignment film has a thickness of at most 200 Å.

35. An apparatus according to claim 25, wherein said alignment film has a thickness of at most 100 Å.

36. An apparatus according to claim 25, wherein said alignment film has been rubbed in one direction.

37. An apparatus according to claim 25, wherein said alignment film is provided to both substrates, and the two alignment films have been rubbed in directions which are parallel and identical to each other.

38. An apparatus according to claim 25, wherein said alignment film is provided to both substrates, and the two alignment films have been rubbed in directions which are almost identical but cross each other at an intersection angle of 2-20 degrees.

39. An apparatus according to claim 25, wherein said alignment film is provided to both substrates, and the two alignment films have been rubbed in directions which are parallel and reverse to each other.

* * * * *

UNITED STATES PATENT AND TRADEMARK OFFICE
CERTIFICATE OF CORRECTION

PATENT NO. : 5,330,803

DATED : July 19, 1994

INVENTOR(S) : HIDEAKI TAKAO, ET AL.

It is certified that error appears in the above-identified patent and that said Letters Patent is hereby corrected as shown below:

ON THE TITLE PAGE

At [57] ABSTRACT, line 5 "substrates," should read --substrates.--.

At [57] ABSTRACT, in Formula (II), "$A_1$" should read --$A_2$-- and " $\frac{1}{n2}$ " should read -- $\frac{1}{n2}$, --.

COLUMN 2

Line 10, "tile" should read --tilt--.
Line 42, "to-a" should read --to a --.

COLUMN 3

Line 44, "$A_1$" should read --$A_2$-- and " $\frac{1}{n2}$ " should read -- $\frac{1}{n2}$, --.
Line 62, "DRAWINGS FIG." should read --DRAWINGS ¶ FIG.--.

COLUMN 5

Line 58, "b 1≧0" should read --1≧0--.

COLUMN 10

Line 64, "date" should read --data--.

COLUMN 11

Line 64, "$-\overset{CF_3}{\underset{CF_3}{C}}-$" should read --$-\overset{CF_3}{\underset{CF_3}{\overset{|}{\underset{|}{C}}}}-$--.

UNITED STATES PATENT AND TRADEMARK OFFICE
CERTIFICATE OF CORRECTION

PATENT NO. : 5,330,803
DATED : July 19, 1994
INVENTOR(S) : HIDEAKI TAKAO, ET AL.

It is certified that error appears in the above-identified patent and that said Letters Patent is hereby corrected as shown below:

COLUMN 14

Line 51, "$A_1$" (in Formula II) should read --$A_2$--
and " 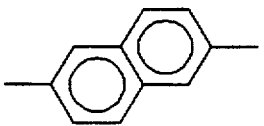 " should read -- 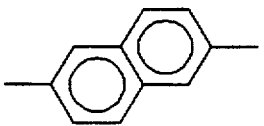, --.
Line 62, "$A_1$ and $A_2$" should read --$A_1$ and $A_2$--.

COLUMN 15

Line 30, " 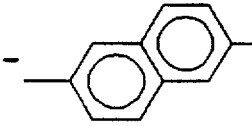 ' " should read -- 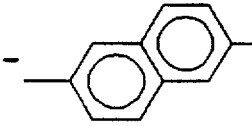 ' and said non---.

COLUMN 16

Line 31, "$A_1$" should read --$A_2$--.
Line 35, " 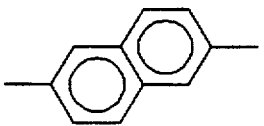 " should read -- 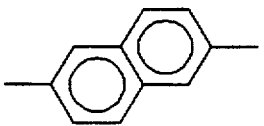, --.

UNITED STATES PATENT AND TRADEMARK OFFICE
CERTIFICATE OF CORRECTION

PATENT NO. : 5,330,803  
DATED : July 19, 1994  
INVENTOR(S) : Hideaki Takao, et al Page 3 of 3

It is certified that error appears in the above-indentified patent and that said Letters Patent is hereby corrected as shown below:

<u>COLUMN 18</u>

Line 4, "$A_1$" should read --$A_2$-- and "$\frac{1}{m'}$" should read --$\frac{1}{m'},$--.

Signed and Sealed this

Thirty-first Day of January, 1995

*Attest:*

BRUCE LEHMAN

*Attesting Officer*     Commissioner of Patents and Trademarks